Feb. 28, 1961 W. A. SCHEUBLEIN, JR., ET AL 2,973,196
VEHICLE RIDE CONTROL SPRING
Filed April 1, 1957

INVENTORS
WILLIAM A. SCHEUBLEIN JR.
AND EDMUND A. CHECK

BY *Gravely, Lieder, Woodruff & Wills*

ATTORNEY

United States Patent Office 2,973,196
Patented Feb. 28, 1961

2,973,196

VEHICLE RIDE CONTROL SPRING

William A. Scheublein, Jr., St. Louis, and Edmund A. Check, Kirkwood, Mo., assignors to Moog Industries, Inc., St. Louis, Mo., a corporation of Missouri Filed Apr. 1, 1957, Ser. No. 649,901

7 Claims. (Cl. 267—45)

This invention relates to improvements in spring means for vehicles, especially ride control springs which are adapted to cooperate with multi-leaf springs.

The basic function of a leaf spring is to support the vehicle weight from the axle and wheel assembly and dissipate road shock by controlling the relative motion between the vehicle body and the axle and wheel assembly. In most commercial vehicles the principal function of the leaf spring is to support the pay load to the full capacity of the vehicle, and the secondary function is to produce a reasonably comfortable ride. Consequently, commercial vehicle springs are made stiff to provide a high spring rate, so that there is very little road shock dissipation and riding comfort as a result thereof.

On the other hand, passenger vehicles are intended to produce a soft ride for maximum comfort and protection to the occupants. The soft ride is generally obtained by making the deflection of the spring suspension as great as possible. This soft ride characteristic has caused difficulties in maintaining stability of the vehicle body during braking, accelerating and cornering, and it is also the cause of excessive roll under cross wind and lateral inertia loads. The soft ride type of spring also reduces the passenger load carrying capacity, a fact which is not generally realized by the average user. This loss in load capacity leads to the further objection of frequent spring strike through and jarring of the passengers. Spring strike through is caused by soft springs which allow deflections of the vehicle body large enough to cause the usual strike through bumpers on the frame to hit axle. Soft ride springs also are subject to the objectionable wind up action which allows the vehicle body to pitch forward on braking and to rear back when accelerating, though it is most noticeable on braking.

The present invention is principally concerned with ride control springs which overcome the foregoing objections in passenger vehicles having soft ride main springs, but the specific embodiment chosen to illustrate the improvements sought may be adapted to other vehicles.

Another object of this invention is to provide a helper spring which may be quickly and easily installed without disturbing the main vehicle springs.

A further object of the invention is to provide a helper spring which will not adversely interfer with the soft ride main springs on passenger vehicles while increasing the load carrying capacity thereof.

Yet another object of this invention is to provide a helper spring which will improve vehicle body stability during braking, accelerating and cornering, and check lateral body roll.

An object of this invention is also to provide spring means which will restore or correct sagging or weak vehicle springs and to obtain body height correction for overcoming the tendency for weak springs to strike through and jar passengers or cause damage to the vehicle.

Other objects and advantages will be pointed out hereinafter or will become evident when a full understanding of the structural and functional features of the present helper spring is obtained.

The invention comprises a helper spring assembly of leaf type adapted to be applied upon the vehicle axle by a suitable saddle, with the spring leaf arranged to have a long span over the rear part of the main vehicle spring and a shorter span over the front part of this vehicle spring. The helper spring is adapted to be simply attached at the rear by a U-bolt and tension leaf which avoids imposing concentrated loads in the main spring, and to be attached at the front by a U-bolt and resilient member which may be a tension leaf, a rubber block or a coil spring. The front attachment is further adapted to provide adjustment for the helper spring to obtain proper vehicle body height correction and helper spring pre-load. This front adjustment of the helper spring incorporates certain novel features which will be described in more detail.

In carrying the invention into practice it has been found that vehicle ride control improvement is obtained by arranging the helper spring assembly in non-symmetrical relation upon the vehicle axle, with the longer span of the helper spring leaf to the rear where its action on the main spring can be adjusted to produce a desirable range of ride control. With respect to the non-symmetrical assembly, the ratio of rear span length to front span length may be varied from approximately two to one to three to one. Where the helper spring is provided with an adjustable front attachment, the installation may be varied as desired to restore main spring sag so that the vehicle body height is corrected, this adjustment being obtained through the leverage advantage of the longer rear span to restore the main spring curvature or to raise the rear portion of the main spring for the same effect on the vehicle body.

Certain preferred embodiments of the present invention will now be described in connection with the accompanying drawings, wherein.

Figure 1:
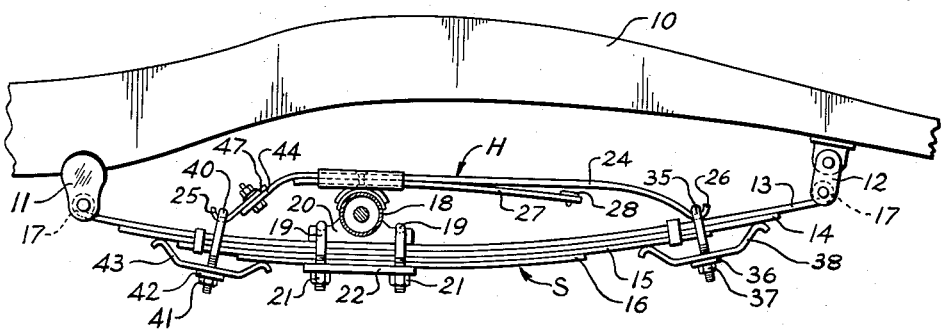
Fig. 1 is a side elevational view of a vehicle spring showing the invention applied thereto.

In the drawings, the vehicle frame member 10 is provided with a front spring shackle 11 and a rear spring shackle 12 for mounting the main spring S composed of spring leaves 13, 14, 15 and 16. In conventional manner the main leaf 13 is formed with end eyes 17 for connection to the shackles 11 and 12, while the spring S is connected to the vehicle axle 18 by U-bolts 19 engaging upon an axle saddle 20 and secured by nuts 21 and a base plate 22. The foregoing assembly is generally conventional and per se forms no part of the invention.

Figure 2:
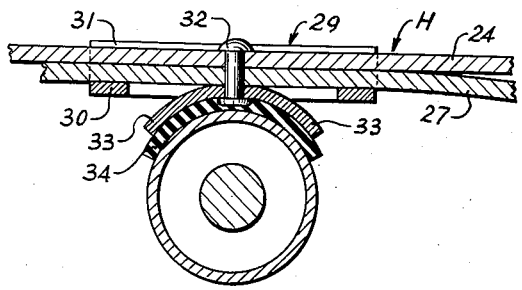
Fig. 2 is an enlarged fragmentary sectional elevational view of a portion of the spring shown in Fig. 1.

The novel part of the spring assembly is embodied in the helper spring shown generally at H, and in the means whereby this helper spring is mounted upon the usual axle 18 and main spring S. The helper spring H consists in a main leaf 24 having the U-bolt engaging ends 25 and 26, and an auxiliary leaf 27 provided with a resilient pad 28 at its rearward end. The auxiliary leaf 27 is provided to improve the simplicity of the assembly and obtain better ride control with load carrying capacity. The presence of leaf 27 makes it possible to form leaf 24 of suitable material and of workable size and thickness. This is an economic advantage as a relatively light leaf 24 having low load carrying ability can be used to add greatly to the stabilizing influence of the helper spring H upon the main spring S. The addition of the auxiliary leaf 27 adds additional load carrying capacity to the action of the springs at the point where the spring rate should build up quickly to compromise the added load with riding comfort. In Fig. 2 the helper spring H is mounted upon the axle 18 by means of the saddle member 29. This member is integrally formed and consists in a channel-shaped body having a bottom wall 30 and spaced side walls 31. The body is open at both ends and at the top to receive the spring leaves 24 and 27, and a rivet 32 secures these parts in assembly. The bottom wall 30 is suitably lanced or punched to provide a pair of ears 33 extending in opposite directions and bent downwardly to form a curved seat to rest upon the axle 18, but the central portion is left integral so that a one-piece body results. A resilient pad 34 of rubber or equivalent material is disposed between the ears 33 and the axle 18 for the purpose of deadening the noise which occurs during excessive spring travel causing the spring to lift the saddle 29 off the axle 18 and return with a bang. The pad also avoids wear of the ears 33 on the axle 18. The saddle member as thus formed retains the spring leaves 24 and 27 in alignment and provides a base by which the helper spring H is carried upon the axle.

The helper spring H is further mounted upon the main spring S by means of a U-bolt 35 engaged in the rear end 26 and extending downwardly to connect with a cross plate 36 by the nuts 37. The plate 36 is set crosswise of the main spring S and supports a tension leaf 38 beneath the main spring. The leaf 38 extends longitudinally of this main spring and spans one or more of the main spring leaves. The leaf 38 exerts a resilient force upon the U-bolt 35 to keep the parts from rattling, but the leaf 38 allows some movement in the helper spring end 26 along the main spring S as the two springs work. The forward end of the helper spring H is adjustably and resiliently connected to the main spring S by a U-bolt 40 engaged in the spring end 25 above the main spring, and connected at its lower end by suitable nuts 41 and a cross plate 42 to a tension leaf 43 providing a resilient force upon the end 25 of the helper spring H. The leaf prevents rattle and allows movement in the U-bolt as the spring end 25 moves along the main spring. In some installations a leaf will not fit, so modifications are made, as will be explained.

Figure 3:
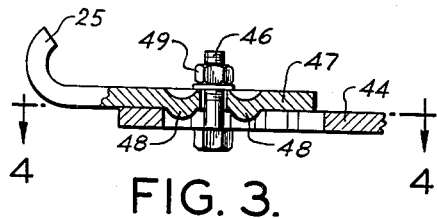
Fig. 3 is a further sectional view of a portion of the spring shown in Fig. 1.
Figure 4:
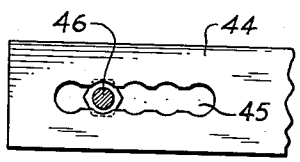
Fig. 4 is a fragmentary view seen along line 4—4 in Fig. 3.

In Figs. 1, 3 and 4, the forward end 44 of the helper spring leaf 24 is formed with a series of connected openings 45 which form a longitudinal slot having recesses in its side edges to adjustably receive a bolt 46 and allow the bolt shank room to shift lengthwise from one opening 45 to the next when the bolt is loosened. An end plate 47, having the formed end 25 previously noted, is adjustably connected by the bolt 46 to the end 44 of the spring leaf 24, and the plate 47 is formed with a pair of projections or nibs 48 pressed into the material and adapted to seat in spaced openings 45 on opposite sides of the opening 45 which receives the bolt 46. The nut 49 and bolt 46 retain the plate 47 with the shear resisting nibs seated in the side recesses of the openings 45 in the spring end 44. Also the nibs 48 cooperate with the openings 45 to prevent plate 47 from turning relative to the end 44. Adjustment is made by loosening nut 49 on the bolt 46 and shifting the plate 47 to reseat the nibs 48 in opening 45, thereby making it possible to lengthen or shorten the effective length of this end of the leaf 24, as may be desired.

Figure 5:
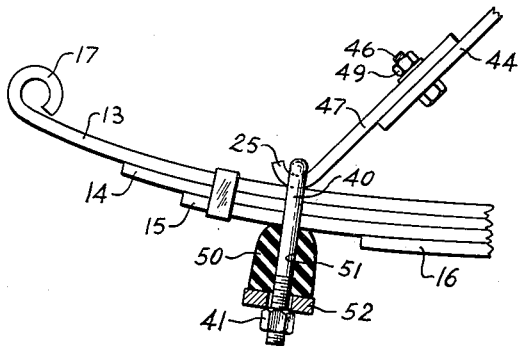
Fig. 5 is an enlarged fragmentary view, partly in sectional elevation, of a modification of the spring shown in Fig. 1.

The modification of Fig. 5 includes the adjustable features of the plate 47, as above described, but differs in respect of the resilient means which cooperates with the U-bolt 40. In this instance the tension leaf 43 is replaced by a resilient member 50 of rubber or equivalent material which bears crosswise of the spring S and is formed with openings 51 (one being shown) to receive the ends of the U-bolt 40. A plate 52 engages the member 50 and the nuts 41 bear upon this plate. The resilient member 50 differs from the tension leaf 43 in that it engages only one leaf (leaf 15) of the main spring S.

Figure 6:
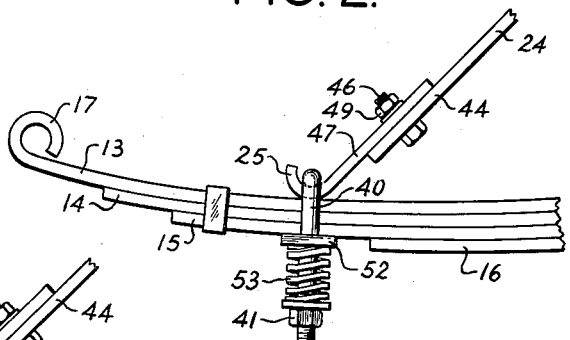
Fig. 6 is a view similar to Fig. 5 showing a further modification.

A further modification is illustrated in Fig. 6, wherein the resilient member 50 is replaced by a pair of springs 53 (only one being shown) which are placed on each leg of the U-bolt 40. In this assembly, the plate 52 of Fig. 5 is now moved up to bear upon spring leaf 15, the springs 53 engage under the plate and the nuts 41 engage the springs 53.

The installation of the helper spring H is accomplished in the following manner, and it is essentially the same for the several disclosures of Figs. 1, 5 and 6. The helper spring H with its saddle member 29 fixed thereto, as described, is placed against the axle 18 in the manner shown in Fig. 1 with the longer end directed toward the rear. The U-bolt 35 is placed in position in the end 26 to straddle the main spring S, the resilient element or tension leaf 38 is placed in position, and the nuts 37 and plate 36 are assembled. Nuts 37 are tightened until the end 26 is drawn down upon the top leaf 13 of the main spring S. The front end of the helper spring H is then attached so that the end 25 is initially (Fig. 1) spaced above the top leaf 13 of the main spring S. The spacing depends upon the vehicle characteristics, and in most cases may not have to be less than three fourths inch or more than one and one eighth inches to obtain preload, restoration or spring position or the other good effects. This spacing is obtained by adjusting the plate 47 relative to the end 44, as described, with due consideration being given the desired degree of initial load in the helper spring H. The final assembly is obtained by tightening the nuts 41 on the U-bolt 40 until the tension leaf 43 is drawn up under the main spring S to hold the end 25 against the main spring leaf 13, as shown in Fig. 5. As the nuts 41 are drawn up, the end 25 of the helper spring H is pulled down, thereby elevating the rear end 26 which lifts the main spring.

The assembly of the helper spring H with the modified resilient member 50 of Fig. 5, or the coil springs 53 of Fig. 6 is effected in like manner, with the amount of load in spring H preselected as above described so that the end 25 is engaged with the top leaf 13 of main spring S. This is made easy by suitable adjustment of the end plate 47 relative to end 44 of spring leaf 24.

The present invention provides certain advantages, such as greater stability in the riding characteristics of the vehicle when braking, or accelerating or under crosswind loads, greater load carrying capacity when needed without detracting from the desired soft ride feel under normal loading, and marked reduction in the sudden transition from the soft ride feel to the stiff ride which has been characteristic of other helper spring assemblies. Heretofore, helper springs have been generally designed to come into effect with a sudden increase in stiffening of the main spring, due to the geometry of the assembly or spacing of such springs at one or both ends from the main spring, or in arranging the auxiliary spring in some other way so that it cannot begin to exert itself until the main spring has deflected to some degree. The helper spring H of this example exerts an influence upon the main spring S at all times, but the effect is negligibly small at small deflections and gradually increases so as not to change the soft ride feel for ordinary deflection at light loads. As the load increases the soft ride main spring S is increasingly helped by the helper spring H so that the load may increase for the same amount of deflection. This improvement, along with the other advantages already noted, is obtained by firmly connecting the ends 25 and 26 of the helper spring H to the main spring S. Adjustments are possible by the simple resetting of the plate 47 relative to spring end 44 so that more or less length is available for causing variations in the amount of lift effected at spring end 26 and, hence, variations in the helper spring pre-load. For example, if the helper spring is needed to restore the vehicle height the end 26 must elevate the main spring S and this requires increased pre-loading in order of the helper spring to accomplish the job. If increased load capacity is needed, pre-load may be added by initially providing greater clearance at the end 25 of the auxiliary spring H.

This invention is effective in the particulars noted and greatly improves the feel and ride of the vehicle. It is believed that the nature of the improvement is now fully understood so that changes made therein by parts which are equivalent will be recognized.

What we claim is:

1. In a vehicle with a main leaf spring fastened at its ends and at a medial portion to the vehicle axle, the improvement of a helper spring demountably seated against the vehicle axle adjacent the medial portion of the main spring, said helper spring extending in opposite directions from its seat with one portion extending farther from its seat than the opposite portion, and resilient attachment means connecting the end of said oppositely extending portions of said helper spring to the main leaf spring, the resilient attachment means for one end of said helper spring including an adjustable end plate selectively positionable on the said one end of the helper spring to shorten or lengthen the effective length of said one end, a resilient member, and bolt means engaging the main spring through said resilient member of the attachment means to hold the helper spring, adjustment of said one end of the helper spring causing the helper spring to move relative to its seat and change the effect on the main spring of the attachment of the other end of the helper spring.

2. In a vehicle with a main leaf spring fastened at its ends to the frame portion of the vehicle and at a medial portion to the axle portion of the vehicle, the improvement of a helper leaf spring, a saddle carrying said helper spring and providing a seat demountably engageable on the vehicle axle, said helper spring having a main leaf with one end extending rearwardly from said saddle a greater distance than a forwardly extending end, and attachment means connecting the ends of said helper spring main leaf to the main leaf spring, one of said attachment means including an end plate, means adjustably securing said end plate to said helper spring leaf to selectively lengthen or shorten the effective length of said helper spring main leaf, resilient means, and connector means engaging said end plate and effectively engaging the main leaf spring through said resilient means.

3. The improvement set forth in claim 2, wherein the length of the portion of said helper spring extending rearwardly is at least twice the length of the portion extending forwardly as measured from the vehicle axle.

4. The improvement set forth in claim 2, wherein said adjustable securing means for the end plate and helper spring leaf consists in a series of apertures formed in said helper spring leaf, a bolt hole and an adjacent projection formed in said end plate, and a bolt securing said end plate and helper spring leaf in adjusted relation with said projection seated in one of said series of apertures, said bolt and projection preventing said end plate from turning relative to said helper spring leaf.

5. The improvement set forth in claim 2, wherein the longer end of said helper spring leaf extends to the rear of the vehicle axle, and said one attachment means is secured to the forward end of said helper spring leaf.

6. In a ride control spring device for a vehicle main spring, the main spring being connected at a location intermediate its ends to the vehicle axle and adjacent its ends to the vehicle frame, the improvement of a helper spring removably disposed on the vehicle axle independently of the main spring and arranged adjacent the main spring in longitudinal alignment, said helper spring being shorter than the main spring, means attaching one end portion of said helper spring to the main spring including a resilient tension element acting to retain said one end portion against the main spring, said helper spring passing the vehicle axle at the side opposite the main spring, other means attaching the opposite end of said helper spring to the main spring including threaded elements to draw said opposite end against the main spring and resilient tension means acting through said threaded elements to retain said helper spring in operative ride control relation with the main spring, and saddle means engaging said helper spring and having a seat engaging the vehicle axle, said seat being held engaged with the axle by said helper spring and being removable and free to rock on the axle to conform with motion of said helper spring.

7. In a ride control spring device for a vehicle having a main leaf spring connected between its ends to the vehicle axle and adjacent its ends to the vehicle frame, the improvement of a helper spring removably disposed on the vehicle axle independently of the main spring and having at least one main leaf in longitudinal alignment with the main vehicle spring and shorter than the main vehicle spring, means resiliently attaching one end of said helper spring main leaf to the main vehicle spring, other means attaching the opposite end of said helper spring main leaf to the main vehicle spring including threaded means effective to draw the said opposite end toward the main vehicle spring and resilient tension means acting through said threaded means to retain said helper spring in operative ride control relation with the main vehicle spring, and saddle means connected to said helper spring main leaf in position to removably abut the vehicle axle and move relative thereto with helper spring movement, said saddle means including sound deadening means thereon positioned to lie adjacent the vehicle axle.

References Cited in the file of this patent

UNITED STATES PATENTS

| | | |
|---|---|---|
| 1,137,155 | Lock | Apr. 27, 1915 |
| 1,325,604 | Andrew | Dec. 23, 1919 |
| 1,459,983 | Matthews | June 26, 1923 |
| 1,564,299 | Welsh | Dec. 8, 1925 |
| 1,593,077 | Hollopeter et al. | July 20, 1926 |
| 1,612,413 | Blair | Dec. 28, 1926 |
| 2,058,281 | Wesley | Oct. 20, 1936 |
| 2,301,398 | Haynes | Nov. 10, 1942 |
| 2,587,522 | Pilkington | Feb. 26, 1952 |
| 2,762,445 | Polhemus et al. | Sept. 11, 1956 |

FOREIGN PATENTS

| | | |
|---|---|---|
| 1,108,381 | France | Aug. 31, 1955 |